United States Patent
Gibson

(10) Patent No.: US 6,406,373 B1
(45) Date of Patent: Jun. 18, 2002

(54) DUST GUARD AND CROSS ASSEMBLY FOR A UNIVERSAL JOINT

(75) Inventor: Daniel W. Gibson, Maumee, OH (US)

(73) Assignee: Spicer Driveshaft, Inc., Holland, OH (US)

(*) Notice: Subject to any disclaimer, the term of this patent is extended or adjusted under 35 U.S.C. 154(b) by 0 days.

(21) Appl. No.: 09/747,490

(22) Filed: Dec. 21, 2000

(51) Int. Cl.$^7$ .............................................. F16D 3/41
(52) U.S. Cl. ...................................... 464/131; 464/133
(58) Field of Search ................................ 464/130, 131, 464/133; 277/549, 560

(56) References Cited

U.S. PATENT DOCUMENTS

| | | | |
|---|---|---|---|
| 2,773,367 A | | 12/1956 | Slaght |
| 2,773,368 A | * | 12/1956 | Slaght .......................... 464/130 |
| 3,178,907 A | | 4/1965 | Lyons |
| 3,479,840 A | * | 11/1969 | Meyers ........................ 464/131 |
| 3,798,926 A | | 3/1974 | Weible |
| 3,828,578 A | | 8/1974 | Herscovici |
| 3,846,995 A | * | 11/1974 | Mangiavacchi ............. 464/131 |
| 3,906,746 A | * | 9/1975 | Haines ........................ 464/131 |
| 4,129,016 A | | 12/1978 | Olson, Sr. |
| 4,310,206 A | | 1/1982 | Weible |
| 4,613,317 A | * | 9/1986 | Morihiro .................... 464/131 |
| 5,716,277 A | | 2/1998 | Reynolds |
| 6,050,899 A | * | 4/2000 | Jones et al. ................. 464/131 |
| 6,077,166 A | | 6/2000 | Reynolds |

FOREIGN PATENT DOCUMENTS

| | | | | |
|---|---|---|---|---|
| GB | 1216973 | * | 12/1970 | ................. 464/14 |
| IT | 589462 | * | 3/1959 | ................. 464/130 |

* cited by examiner

Primary Examiner—Greg Binda
(74) Attorney, Agent, or Firm—MacMillan, Sobanski & Todd, LLC

(57) ABSTRACT

A structure positively retains the bearing cups on the trunnions of a universal joint cross prior to assembly into a vehicle. The cross includes a body portion having a plurality of trunnions extending outwardly therefrom. Each of the trunnions may have an annular ridge formed thereon defining an increased outer diameter. A bearing cup is rotatably mounted on each of the trunnions. Each of the bearing cups has a rigid dust guard attached thereto. Each of the dust guards has an inwardly extending portion that defines an inner diameter. The inwardly extending portion of each of the dust guards extends at an angle that is less than ninety degrees relative to an axis defined by the associated trunnion and relative to the sides of the bearing cups. The inner diameters defined by the inwardly extending portions of the dust guards are smaller than the outer diameters defined by the annular ridges. Thus, during installation, the inwardly extending portions of the dust guards snap over the outwardly extending ridges formed on the trunnions. In this manner, the bearing cups are positively retained on the trunnions during shipment.

8 Claims, 3 Drawing Sheets

DUST GUARD AND CROSS ASSEMBLY FOR A UNIVERSAL JOINT

BACKGROUND OF THE INVENTION

This invention relates in general to universal joints and in particular to an improved structure for positively retaining the bearing cups on the trunnions of a universal joint cross prior to assembly into a vehicle.

Universal joints are well known devices that provide a driving connection between two members adapted to rotate about non-aligned axes of rotation. Universal joints are widely used to connect rotatable members in vehicle drive train systems. In a typical drive train system, a first universal joint is connected between an output shaft of an engine/transmission assembly and a first end of a driveshaft tube, while a second universal joint is connected between a second end of the driveshaft tube and an input shaft of an axle assembly. The universal joints, provide a rotational driving connection from the output shaft of the engine/transmission assembly through the driveshaft tube to the input shaft of the axle assembly, while accommodating a limited amount of angular misalignment between the rotational axes of these three shafts.

A typical structure for a universal joint includes a cross having a central body portion with four cylindrical trunnions extending outwardly therefrom. The trunnions are oriented in a single plane and extend at right angles relative to one another. A hollow cylindrical bearing cup is mounted on the end of each of the trunnions. Needle bearings or similar means are provided between the outer cylindrical surfaces of the trunnions and the inner cylindrical surfaces of the bearing cups to permit relative rotational movement between the trunnions and the bearing cups. The bearing cups mounted on a first opposed pair of the trunnions are connected to a first yoke that, in turn, is secured to one of the rotatable components of the vehicle drive train system. Similarly, the bearing cups mounted on a second opposed pair of the trunnions are connected to a second yoke that, in turn, is secured to a second one of the rotatable components of the vehicle drive train system.

Frequently, the first and second universal joints are manufactured concurrently with the driveshaft tube at a first location, then shipped as a unit to a second location for assembly with the other components of the vehicle drive train system. In such a manufacturing process, the yokes are initially secured to the ends of the driveshaft tube, then the universal joints are connected to the yokes. Therefore, for each of the universal joints, only one opposed pair of the bearing cups is connected to a yoke and, therefore, positively retained on the respective trunnions. The other opposed pair of the bearing cups remains mounted on the respective trunnions, but is not positively retained on the bearing cups. Following installation on the yokes, each of the universal joints is purged with lubricant. Such purging is well known in the art and involves the injection of lubricant within the cross at a relatively high pressure. The lubricant passes through bores formed through each of the trunnions so as to move into the regions of the bearings disposed between the bearing cups and the trunnions.

It is known to provide elastomeric seals about the open ends of the bearing cups to retain lubricant in the region between the outer surface of the trunnion and the inner surface of the bearing cup where the roller bearings are located. The elastomeric seals also function to prevent the entry of dirt and other contaminants into the regions where the roller bearings are located. Additionally, it is known to provide rigid dust guards about the open ends of the bearing cups to protectively cover the elastomeric seals, and further to prevent the entry of dirt and other contaminants into the regions where the roller bearings are located. In some instances, the elastomeric seal and rigid dust guard have been combined into a single seal and dust guard assembly.

In the past, the rigid dust guards have been used to retain the bearing cups on the trunnions during shipment from the manufacturing facility to the assembly facility, as described above. To accomplish this, it is known to form the dust guard having a first portion that frictionally engages the outer surface of the trunnion and a second portion that engages an annular groove formed in the outer surface of the bearing cup. Although this structure has been generally effective, it has been found that the bearing cups can still become dislodged during shipment if a large impact is applied to the bearing cups. Even if the bearing cups are not removed from the trunnions as a result of these impacts, they may become misaligned. Such misalignment is undesirable because it can result in non-uniform sealing pressures being exerted against the trunnions, resulting in non-uniform lubricant injection during the purging process. Therefore, it would be desirable to provide an improved structure for positively retaining the bearing cups on the trunnions of a universal joint cross during shipping and handling of the cross and bearing cups, and during assembly of the universal joint.

SUMMARY OF THE INVENTION

This invention relates to an improved structure for positively retaining the bearing cups on the trunnions of a universal joint cross prior to assembly into a vehicle. The cross includes a body portion having a plurality of trunnions extending outwardly therefrom. Each of the trunnions may have an annular ridge formed thereon defining an increased outer diameter. A bearing cup is rotatably mounted on each of the trunnions. Each of the bearing cups has a rigid dust guard attached thereto. Each of the dust guards has an inwardly extending portion that defines an inner diameter. The inwardly extending portion of each of the dust guards extends at an angle that is less than ninety degrees relative to an axis defined by the associated trunnion and relative to the sides of the bearing cups. The inner diameters defined by the inwardly extending portions of the dust guards are smaller than the outer diameters defined by the annular ridges. Thus, during installation, the inwardly extending portions of the dust guards snap over the outwardly extending ridges formed on the trunnions. In this manner, the bearing cups are positively retained on the trunnions during shipment.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
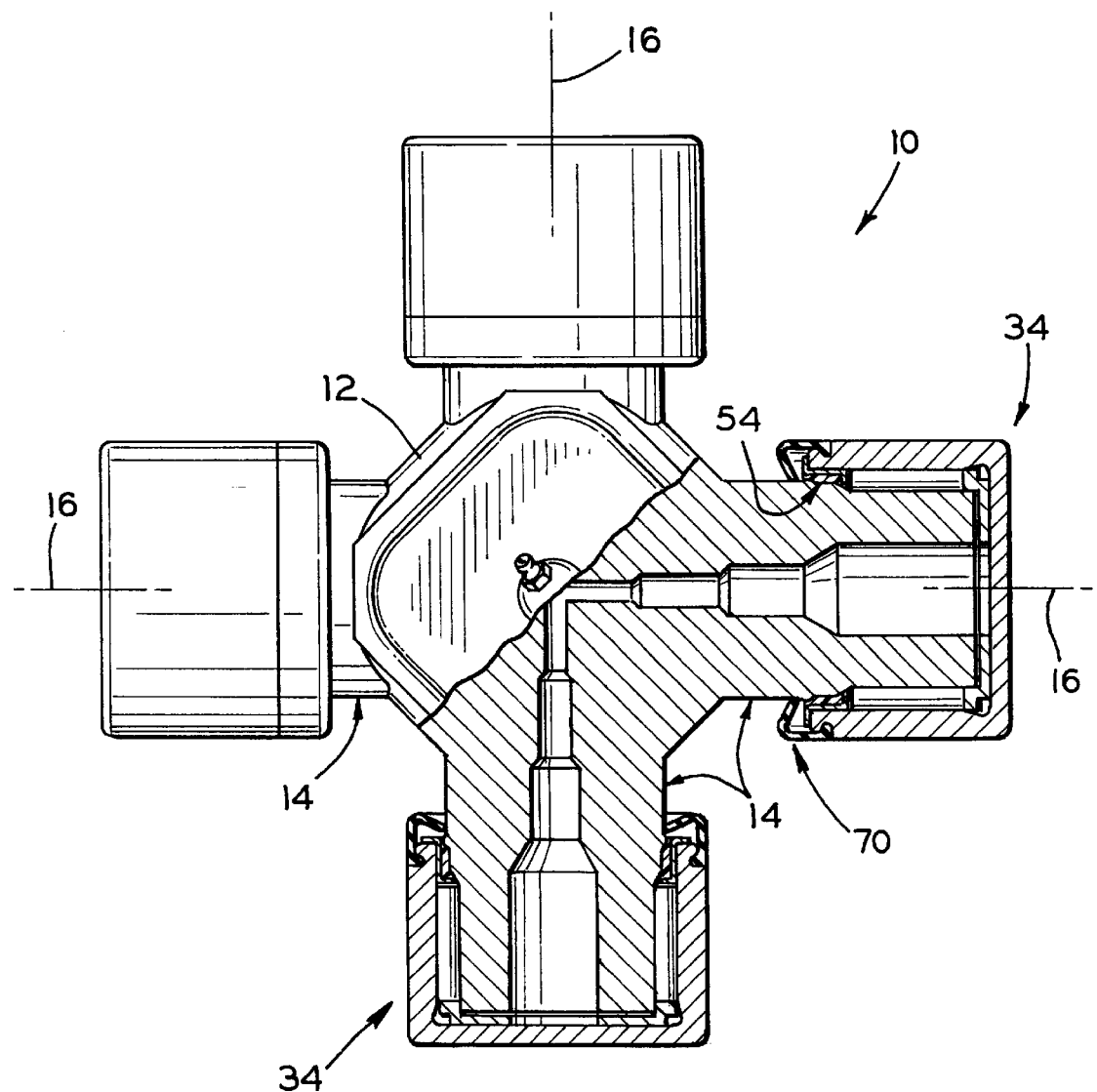
FIG. 1 is an elevational view, partially in cross section, of a cross for a universal joint in accordance with this invention.

Referring now to the drawings, there is illustrated in FIG. 1 a cross, indicated generally at 10, in accordance with this invention. The cross 10 is adapted to form a portion of a conventional universal joint (not shown). The cross 10 includes a central to body portion 12 having a plurality of trunnions, indicated generally at 14, extending outwardly from the body portion 12. In the illustrated embodiment, four of such trunnions 14 are formed integrally with the body portion 12. The trunnions 14 are disposed at right angles relative to one another and are oriented so as to lie in a single plane. The trunnions 14 are generally hollow and cylindrical in shape and extend outwardly from the central body portion 12 along respective longitudinal axes 16.

Figure 2:
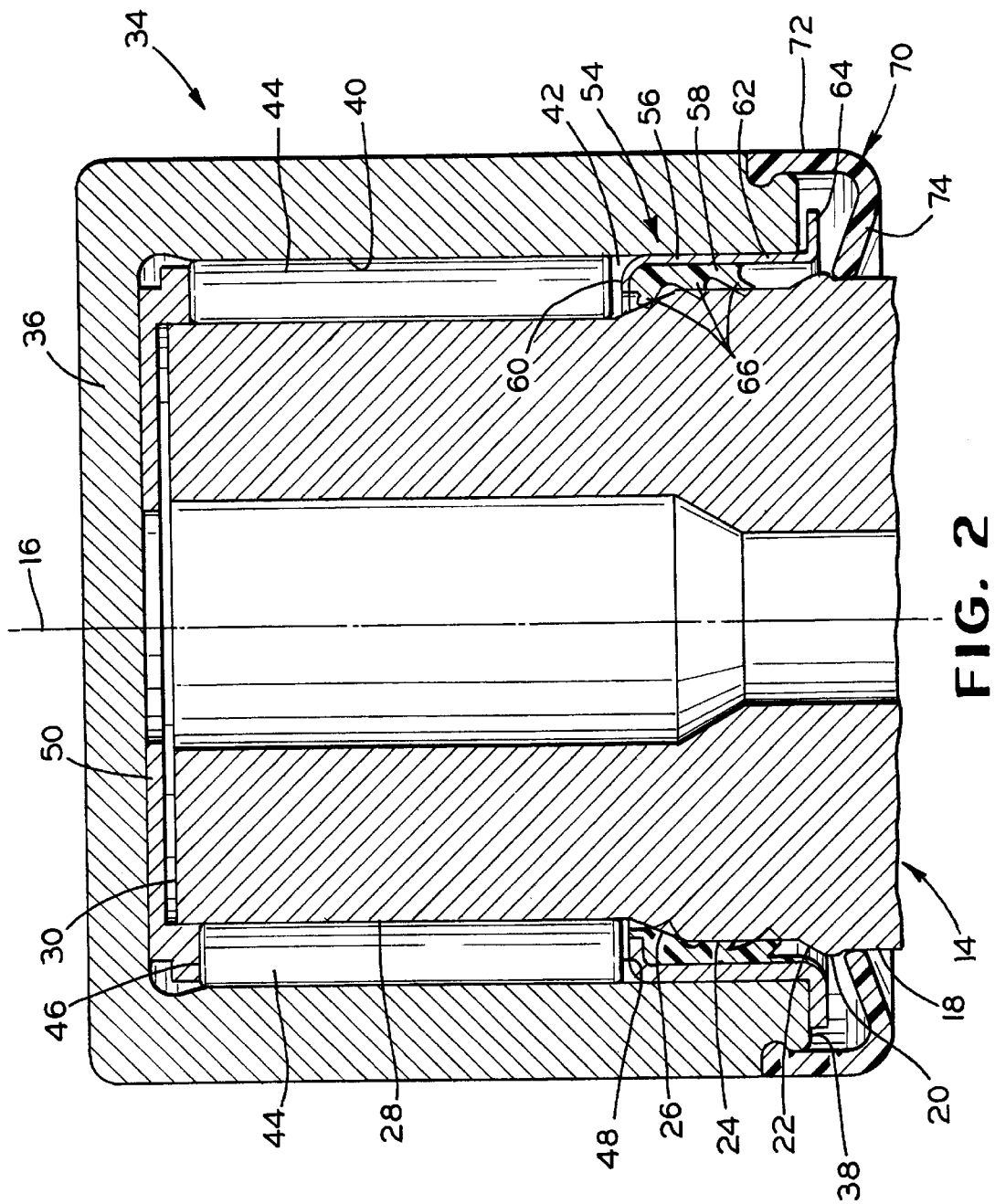
FIG. 2 is an enlarged sectional elevational view of one of the trunnions of the cross illustrated in FIG. 1.

As best shown in FIG. 2, each of the trunnions 14 includes a cylindrical friction surface 18 that extends axially outwardly from the body portion 12 of the cross 10.

An annular ridge 20 is formed in the cylindrical friction surface 18 at or near the axially outer end thereof. A first tapered surface 22 extends axially outwardly from the annular ridge 20. The first tapered surface 22 decreases in diameter as it extends axially outwardly from the annular ridge 20. A cylindrical sealing surface 24 extends axially outwardly from the tapered surface 22. The sealing surface 24 defines a diameter that is slightly smaller than the diameter defined by the friction surface 18. A second tapered surface 26 extends axially outwardly from the sealing surface 24. The second tapered surface 26 also decreases in diameter as it extends axially outwardly from the sealing surface 24. A cylindrical bearing surface 28 extends axially outwardly from the tapered sealing surface 26. The bearing surface 28 defines a diameter that is slightly smaller than the diameter defined by the sealing surface 24. The bearing surface 28 terminates at an axially outer end surface 30 of the trunnion 14.

A bearing cup, indicated generally at 34, is mounted on the ends of each of the trunnions 14 of the cross 10. Each of the bearing cups 34 is generally hollow and cylindrical in shape, including a closed end 36, an open end 38, and a smooth inner cylindrical bearing surface 40. When mounted about the trunnion 14, the closed end 36 of the bearing cup 34 is disposed adjacent to the axially outer end surface 30 of the trunnion 14, while the inner bearing surface 40 of the bearing cup 34 is disposed concentrically about the outer cylindrical bearing surface 28 of the trunnion 14. The diameter defined by the inner bearing surface 40 of the bearing cup 34 is somewhat larger than the diameter defined by the outer bearing surface 28 of the trunnion 14, thereby defining an annular space 42. A plurality of conventional roller bearings 44 (only two are illustrated) are disposed in the annular space 42 in a circumferential array about the trunnion 14. The roller bearings 44 have axially outer ends 46 located adjacent to the closed end 36 of the bearing cup 34 and axially inner ends 48 located adjacent to the open end 38 of the bearing cup 34. As is well known, the roller bearings 44 are provided to facilitate rotational movement of the bearing cup 34 relative to the trunnion 14.

An annular thrust washer 50 is provided between the axially outer end surface 30 of the trunnion 14 and the inner surface of the closed end 36 of the bearing cup 34. The thrust washer 50 is conventional in the art and is provided to reduce the amount of friction between the trunnion 14 and the associated bearing cup 34 when relative rotation occurs. The thrust washer 50 also reduces the amount of friction between the roller bearings 44 and the associated bearing cup 34. Moreover, the thrust washer 50 enables the bearing cup 34 to fit tightly on the trunnion 14 to prevent the cross 10 and trunnion 14 from endwise movement relative to the bearing cup 34 during operation, thereby reducing the amount of undesirable noise and vibration.

An annular seal assembly, indicated generally at 54, is provided about the open end 38 of each of the bearing cups 34. The seal assembly 54 is conventional in the art and includes a metallic support ring 56 and an elastomeric seal 58. The illustrated support ring 56 is generally S-shaped in cross section (although such is not required) and includes a radially inwardly extending flange portion 60, an axially extending body portion 62, and a radially outwardly extending flange portion 64. The central portion 62 defines an outer diameter that is slightly larger than an inner diameter defined by the inner bearing surface 40 of the bearing cup 34. Therefore, the support ring 56 can be pressed into the inner bearing surface 40 and retained within the bearing cup 34 by friction. The elastomeric seal 58 is attached to the support ring 56 by any conventional means, such as by adhesive bonding. The illustrated elastomeric seal 58 includes a plurality of sealing lips 66 (although such is not required) that extends radially inwardly into engagement with the sealing surface 24 and the second tapered surface 56 of the trunnion 14. As best shown in FIG. 2, the sealing lips 66 may extend in different axial directions if desired.

An annular dust guard, indicated generally at 70, is removably secured about the open end 38 of each of the bearing cups 34 for protection of the bearings 44 from dirt and moisture. The dust guard 70 (sometimes referred to as a slinger) is mounted generally circumferentially around the bearing cup 34 and extends inwardly into engagement with the trunnion 14. The illustrated dust guard 70 is generally L-shaped in cross section, including an axially extending outer portion 72 and an inwardly extending inner portion 74. The dust guard 70 can be formed from any desired material. Preferably, the dust guard is formed from a relatively stiff, but somewhat flexible, plastic material, such as Xenon 6123M plastic material that is commonly available in the market.

Figure 3:
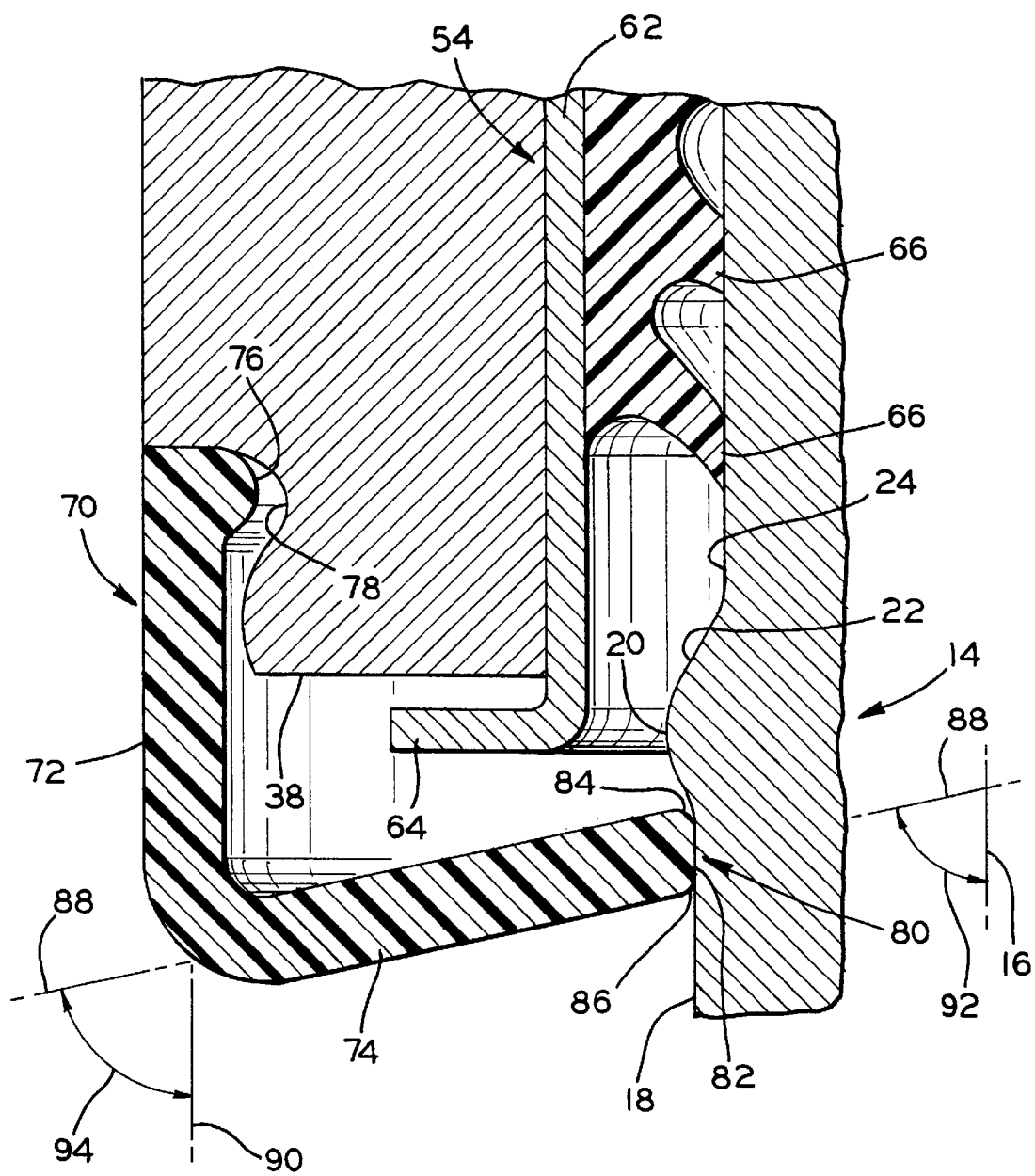
FIG. 3 is a further enlarged sectional elevational view of a portion of the trunnion illustrated in FIG. 2.

As shown more clearly in FIG. 3, the axially extending outer portion 72 of the illustrated dust guard 70 terminates in an annular flange 76 that extends radially inwardly into an annular groove 78 formed in the outer surface of the bearing cup 34. The flange 76 defines an inner diameter that is smaller than the outer diameter of the open end 38 of the bearing cup 34. Therefore, the cooperation of the flange 76 with the groove 78 retains the dust guard 70 on the bearing cup 34.

The inwardly extending portion 74 of the dust guard 70 extends toward the trunnion 14 and terminates in an inner friction surface, indicated generally at 80. Preferably, the inner friction surface 80 is defined by a generally flat major surface 82 bounded by an upper corner 84 and a lower corner 86, both of which have relatively small radii. The inner friction surface 80 preferably extends in a direction that is generally parallel to and concentric with the longitudinal axis 16 of the trunnion 14 and with the cylindrical outer friction surface 18 provided on the trunnion 14. The inner diameter defined by the inner friction surface 80 is preferably slightly smaller than the outer diameter defined by the friction surface 18 of the trunnion 14, although such is not required. Therefore, the inner friction surface 80 of the dust guard 70 frictionally engages the friction surface 18 of the trunnion 14. The inner diameter defined by the inner friction surface 80 is also preferably smaller than the outer diameter defined by the annular ridge 20 extending about the trunnion 14. As a result, the inner friction surface 80 of the dust guard 70 is positively retained on the trunnion 14.

The inwardly extending leg 74 of the dust guard 70 extends in a direction that is illustrated by the dotted line 88 in FIG. 3. Similarly, the axially extending leg 72 of the dust guard 70 extends in a direction that is illustrated by the dotted line 90 in FIG. 3, which is also generally parallel to the axis 16 of the trunnion 14. An angle 92 is defined between the line 8 defined by the inwardly extending leg 74 of the dust guard 70 and the axis 16 defined by the trunnion 14, and that angle 92 is less than ninety degrees. Preferably, the angle 92 defined between the inwardly extending leg 74 of the dust guard 70 and the axis 16 of the trunnion 14 is within the range of from about eighty-five degrees to about fifty degrees. Most preferably, the angle 92 defined between the inwardly extending leg 74 of the dust guard 70 and the axis 16 of the trunnion 14 is approximately eighty degrees. Similarly, an angle 94 is defined between the line 88 defined by the inwardly extending leg 74 of the dust guard 70 and the line 90 defined by the axially extending leg 72 of the dust guard 70, and that angle 94 is less than ninety degrees. Preferably, the angle 94 defined between the inwardly extending leg 74 of the dust guard 70 and the line 88 defined by the axially extending leg 72 of the dust guard 70 is within the range of from about eighty-five degrees to about fifty degrees. Preferably, the angle 92 defined between the inwardly extending leg 74 of the dust guard 70 and the axis 16 of the trunnion 14 is approximately eighty degrees.

To assemble the universal joint, the thrust washer 50 and the roller bearings 44 are initially assembled into the bearing cups 34. The elastomeric seal 54 is then pressed into frictional engagement with the inner bearing surface 40 of the bearing cup 34. Next, the dust guard 70 is snapped onto the open end 38 of the bearing cup 34 by pushing the axially extending portion 72 of the dust guards 70 over the open end 38 until the flange 76 snaps into the groove 78. When this occurs, the dust guard 70 is retained about the open end 38 of the bearing cup 34. However, because the inner diameter of the axially extending portion 72 of the dust guard 70 is slightly larger than the outer diameter of the open end 38 of the bearing cup 34, the dust guard 70 fits loosely on the bearing cup 34. The bearing cup 34 is next assembled onto the trunnion 14 by positioning the open end 38 adjacent to the axially outer end surface 30 of the trunnion 14. The bearing cup 34 is then moved axially inwardly toward the body portion 12 of the cross 10. Little frictional resistance is initially offered against such movement because the inner diameter of the dust guard 70 is larger than the outer diameters of the bearing surface 28 and the sealing surface 24 of the trunnion 14. When the inner friction surface 80 of the dust guard 70 approaches the annular ridge 20, additional force must be applied to overcome the interference fit between the inner friction surface 80 of the dust guard 70 and annular ridge 20. Such additional force causes the inner friction surface 80 to snap over the annular ridge 20 and slide onto the friction surface 18 of the trunnion 14. At this point, the bearing cup 34 is properly positioned relative to the trunnion 14.

The flexible character of the dust guard 70 permits axial displacement of the inwardly extending portion 74 of the dust guard 70, as well as radial displacement of the axially extending portion 72 of the dust guard 70. As the dust guard 70 is mounted about the trunnion 14, the inwardly extending portion 74 is advanced towards the crest of the annular ridge 20. As the inwardly extending portion 74 is advanced towards the crest, the inwardly extending portion 74 flexes axially outwardly and away from the body portion 12 of the cross 10. As the inwardly extending portion 74 reaches the crest, the axially extending portion 72 flexes radially outwardly. As the inwardly extending portion 74 is advanced beyond the crest, the inwardly extending portion 74 flexes axially inward towards the body portion 12 of the trunnion 14. At this juncture, the inner friction surface 80 is generally parallel to the cylindrical outer surface 18 of the trunnion, and the axially extending portion 72 resumes a position substantially parallel to the axis 16 of the trunnion 14. The insertion of the bearing cup 34 and the dust guard 70 is facilitated by the slanted orientation of the inwardly extending leg 74 onto the trunnion 14. The slanted orientation reduces the force needed for installation of the cup assembly onto the trunnion. The friction surface 80 of the dust guard 70 frictionally engages the friction surface 18 of the trunnion 14. A tight frictional contact is achieved because the inner diameter of the friction surface 80 of the dust guard 70 is slightly smaller than the outer diameter of the friction surface 18 of the trunnion 14, and because the generally flat inner friction surface 80 grips the outer friction surface 18 of the trunnion.

Because of the interference fit between the frictional surface 80 and the protrusion 20, and further because of the frictional engagement between the friction surface 80 of the dust guard 70 and the friction surface 18 of the trunnion 14, the dust guard 70 is retained on the trunnion 14 when installed as set forth above. The bearing cup 34 is also retained on the trunnion 14, since the flange 76 of the dust guard 70 extends into the groove 78 of the bearing cup 34. Further, the slanted orientation of the inwardly extending leg 74 increases the load required to pull the bearing cup 34 off the trunnion, thereby inhibiting or hindering removal of the dust guard 70 from the trunnion. By retaining the bearing cup 34 on the trunnion 14 in this manner, there is generally no need for external straps or other devices to retain the bearing cup 34 on the trunnion 14 when shipping the cross 10 for subsequent installation. The angle (92 or 94) of the slant of the inwardly extending leg 74 can be adjusted to increase or decrease assembly or disassembly loads as desired. By making the upper corner 84 of the inner friction surface 80 small, the disassembly load will be increased. The slanted design of the dust guard acts to keep the bearing cup 34 on the trunnion during shipping and handling, and during assembly of the universal joint.

Since there is a loose fit between the dust guard 70 and the bearing cup 34 (provided by the clearance between the reduced diameter portion of the bearing cup open end 38 and the axially extending portion 72 of the dust guard 70, and further by the spacing between the groove 78 and the flange 76), the bearing cup 34 is free to rotate relative to the dust guard 70 without interference with dust guard 70, even after installation.

Although the annular ridge 20 has been described and illustrated as being formed in the friction surface 18 at or near the axially outer end thereof, it will be appreciated that the annular ridge 20 may be formed at any other desired location on the trunnion 14. Also, the ridge 20 need not extend completely about the circumference of the trunnion 14, but rather may be formed as one or more discrete portions on the trunnion 14 that are engaged by the inner friction surface 80 of the dust guard 70. Furthermore, although the illustrated ridge 20 is substantially convex in cross sectional shape, other shapes may be used if desired.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A cross for a universal joint comprising:
   a body portion;

a trunnion extending outwardly from said body portion, said trunnion including a surface;

a bearing cup mounted on said trunnion;

a seal that is supported on said bearing cup and extends into engagement with said surface of said trunnion, said seal being formed from a first material; and a dust guard including a first portion that is supported on said bearing cup and a second portion that extends inwardly from said first portion into engagement with said surface of said trunnion, said second portion of said dust guard extending at an angle that is less than ninety degrees with respect to said first portion of said dust guard, said dust guard being formed from a second material that is more rigid than said first material of said seal.

2. The cross defined in claim 1 wherein said second portion of said dust guard extends at an angle that is within the range of from about eighty-five degrees to about fifty degrees with respect to said first portion of said dust guard.

3. The cross defined in claim 1 wherein said second portion of said dust guard extends at an angle of approximately eighty degrees with respect to said first portion of said dust guard.

4. The cross defined in claim 1 wherein the bearing cup has a groove formed herein, and wherein said first portion of said dust guard extends within said groove to support said dust guard on said bearing cup.

5. The cross defined in claim 1 wherein said surface of said trunnion has a ridge formed thereon, and wherein said second portion of said dust guard extends into engagement with said surface of said trunnion between said body portion and said ridge.

6. The cross defined in claim 1 wherein a plurality of trunnions extend outwardly from said body portion and have respective surfaces, a plurality of bearing cups are mounted on said trunnions, a plurality of seals are supported on said bearing cups and extend into engagement with said surfaces of said trunnions, said seals being formed from a first material, and a plurality of dust guards include first portions that are supported on said bearing cups and second portions that extend inwardly from said first portions into engagement with said surfaces of said trunnions, said second portions of said dust guards extending at angle that are less than ninety degrees with respect to said first portions of said dust guards, said dust guards being formed from a second material that is more rigid than said first material of said seals.

7. The cross defined in claim 1 wherein said dust guard protectively covers said seal.

8. The cross defined in claim 1 wherein said second portion of said dust guard terminates in a surface that extends in a direction that is generally parallel with said surface of said trunnion.

* * * * *